Jan. 5, 1937.   M. W. GIESKIENG ET AL   2,066,680
GLARE ELIMINATING SYSTEM
Filed Oct. 30, 1934   3 Sheets-Sheet 1

Inventor
Marion W. Gieskieng
Paul F. Gieskieng
By F. J. O'Brien
Attorney

Jan. 5, 1937. M. W. GIESKIENG ET AL 2,066,680
GLARE ELIMINATING SYSTEM
Filed Oct. 30, 1934    3 Sheets-Sheet 2

Inventor
Marion W. Gieskieng
Paul F. Gieskieng

By
Attorney

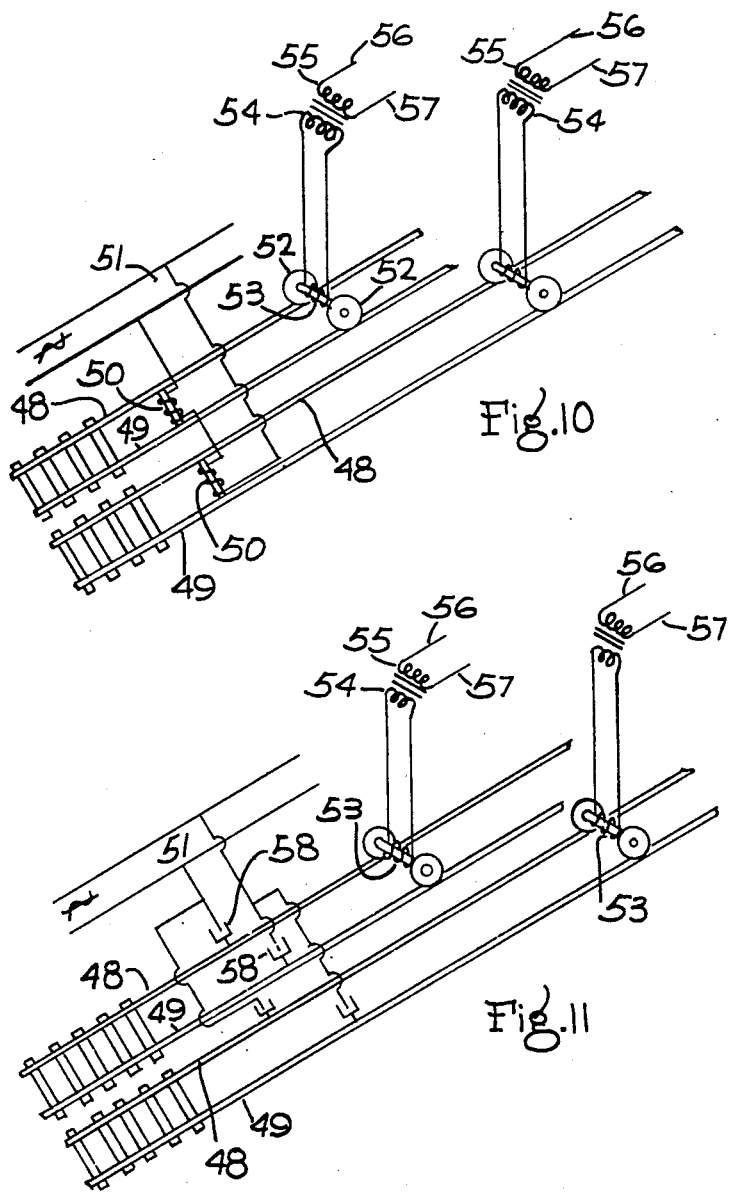

Patented Jan. 5, 1937

2,066,680

UNITED STATES PATENT OFFICE 2,066,680

GLARE ELIMINATING SYSTEM

Marion W. Gieskieng, Little Rock, Ark., and Paul F. Gieskieng, Denver, Colo.

Application October 30, 1934, Serial No. 750,651

12 Claims. (Cl. 88—1)

This invention relates to improvements in systems for glare prevention.

It is well known that when a person faces a strong light, he is temporarily blinded, due to the fact that the intensity of the light is so great that the eye adjusts itself to this intense light and the light rays that come from objects situated outside of the zone of light are therefore not strong enough to impress the retina.

It is also well known that after the eye has been exposed to the action of a strong light, some time is required before the eye can adjust itself and before the impression on the retina disappears and therefore a person exposed to the action of a strong light is temporarily blinded for a considerable period of time.

The great objection to glaring light has been brought to the attention of practically everybody who drives an automobile at night and many schemes have been proposed to overcome the danger due to glaring headlights and to so adjust and arrange the lights that this blinding effect is not produced thereby.

Theoretically, polarized light offers the perfect glare eliminating system. The plane of polarization of the lights of one vehicle is set so as to be ninety degrees opposite the plane of polarization of the approaching light. Each driver has before his eyes a suitable light polarizing agent whose plane is the same as the one on the lights of his vehicle. This arrangement will allow only light from one vehicle to be seen by the operator of that vehicle. This polarizing effect, however, is not practical outside of a laboratory, and has therefore not been developed for commercial use.

The objections due to glaring headlights are also present in connection with locomotives where trains approach each other on double tracks, and accidents have been known to happen due to the fact that the engineers have been temporarily blinded by the headlight of the approaching locomotive.

It is the object of this invention to produce a simple and substantial means for illuminating roadways in front of moving vehicles in such a way that when the engineer of an approaching locomotive or the driver of an approaching car views the approaching vehicle through a certain arrangement of shutter, he will not be affected by the light.

It has been found that when there are about forty-eight light interruptions per second, the effect on the eye is that of continuous illumination, and there is no apparent flicker.

It is the object of this invention to take advantage of the well known persistence of vision properties of the retina, so as to avoid the objections of glare while at the same time permitting perfect illumination of the roadway.

This invention, briefly described, consists in providing a rotating shutter in front of a headlight and providing a similar rotating shutter in front of the eyes of the approaching driver and synchronizing these shutters so that when the light is permitted to shine through the opening in the shutter located in front of it, the shutter in front of the approaching driver will interpose an opaque portion between the eyes of the driver and the approaching headlight and in this way the approaching driver, although he can see the headlight when illuminated by a lamp on his own vehicle, will not see the light that emerges from the approaching headlight and in this way glare is completely eliminated. Instead of employing a shutter in front of the light, a gaseous conduction or vapor lamp can be employed and the light interrupted periodically and in synchronism with the shutter before the eyes of the driver.

Having thus briefly described the objects of this invention, the same will now be described in detail, and for this purpose, reference will be had to the accompanying drawings in which the invention has been illustrated, and in which.

Figure 3:
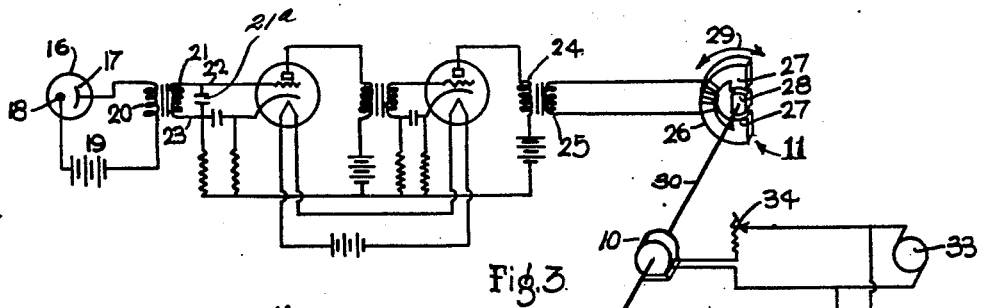
Figure 5:
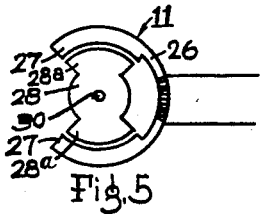
Figure 4:
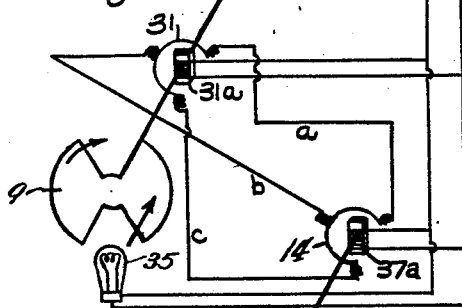
Figure 4:
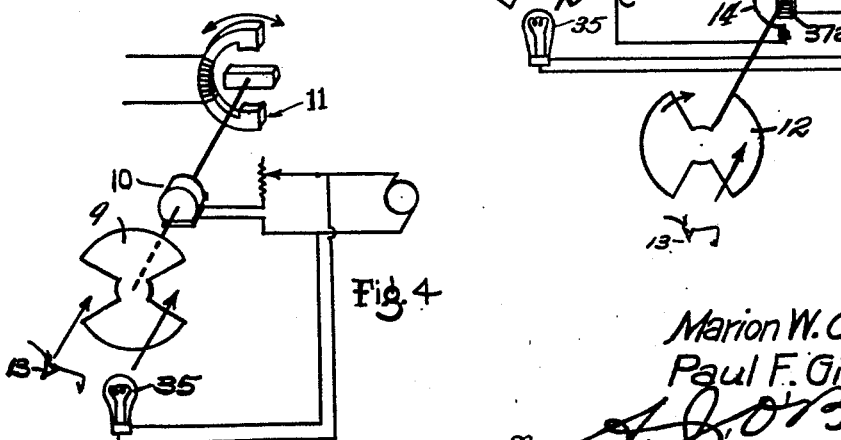
Figure 6:
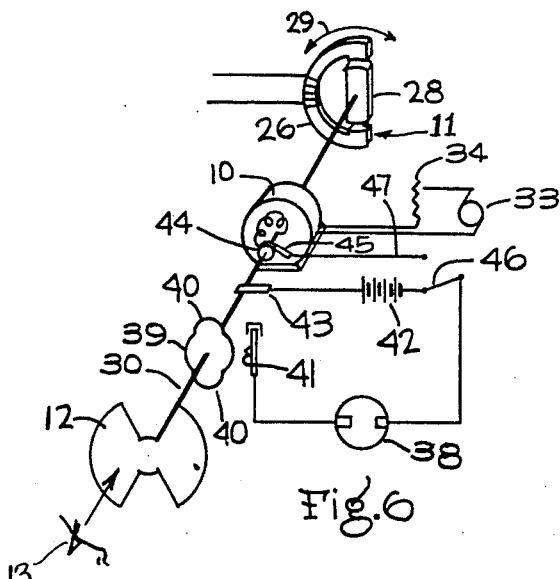
Figure 7:
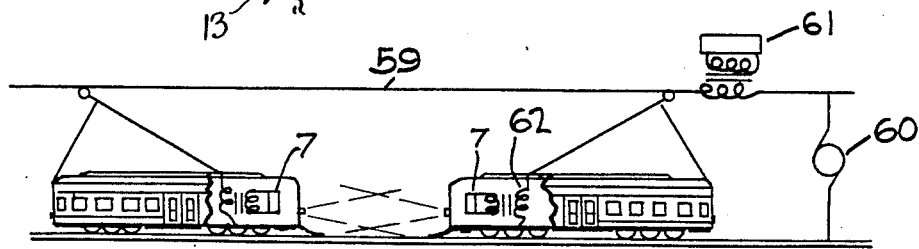
Figure 8:
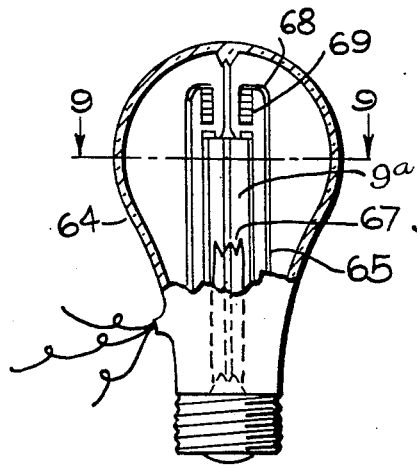
Figure 9:
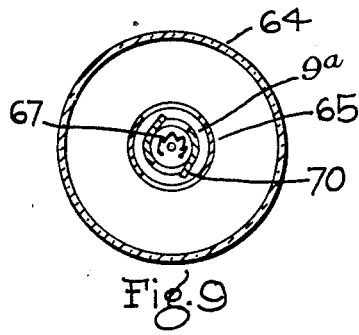

Fig. 3 is a diagrammatic representation showing a photo-electric cell connected with a tuned amplifying circuit in such a way as to control a phonic wheel that is employed to keep a variable speed motor rotating at a predetermined speed for the purpose of controlling the rotation of a shutter and this diagram also shows the interconnection between a generator and a synchronous motor employed for operating a second shutter;

Fig. 4 is a diagram showing an arrangement in which a single motor and shutter are employed to interrupt the line of vision and the light beam;

Fig. 5 is a diagrammatic representation of the phonic wheel employed for maintaining synchronous operation;

Fig. 6 is another diagram showing the use of a vapor or gaseous conduction lamp in place of the ordinary incandescent lamp employed in the other diagrams;

Fig. 7 is a view showing two approaching electrically driven cars employing a trolley and shows the location of means for superimposing upon the driving current a ripple or signal current that is employed for synchronizing the shutters on the approaching cars;

Fig. 8 is a side elevation of a lamp in which the shutter is incorporated within the lamp bulb so as to operate in a very low pressure chamber;

Fig. 9 is a section taken on line 9—9, Fig. 8;

Fig. 10 is a diagram showing an arrangement by means of which the synchronizing impulses can be obtained by means of an arrangement that magnetizes the rails so as to produce a variable magnetic flux through the axles of the approaching locomotives; and Fig. 11 is another view showing how the impulses can be transmitted to the moving locomotive by means of an alternating current potential applied to the rails by means of condensers.

Figure 1:
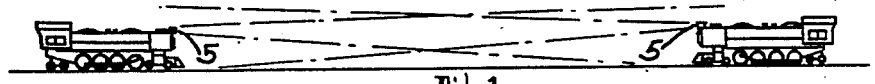
Fig. 1 is a view showing two locomotives approaching each other on parallel tracks and shows the outline of the light beams projected from the headlights.
Figure 2:
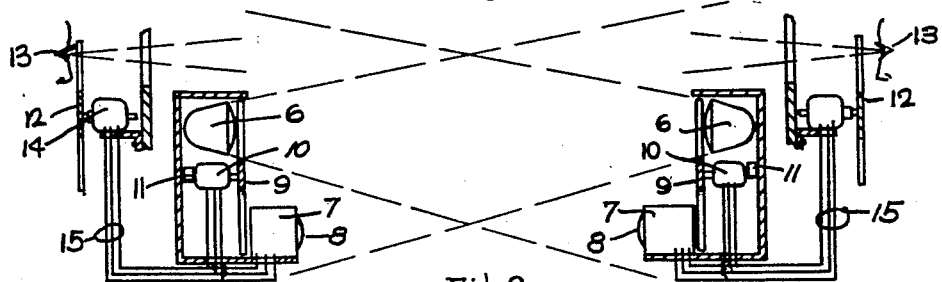
Fig. 2 is a diagram showing the relative position and arrangement of the lamps, the shutters, the synchronizing apparatus and the motors for operating the shutters.

In Fig. 1 the headlights and the control apparatus have been shown as located at the front of the locomotive in a position indicated by reference numeral 5, although it is evident that the headlights may be located directly in front of the boiler if desired. In Fig. 2 the reflectors in which the lamps are located have been indicated by reference numerals 6 and the housings containing the photo-electric cells and the amplifying means have been designated by reference numerals 7. Reference numerals 8 designate lenses located in front of the photo-electric cells. The shutters 9 are located in front of the headlights and are each rotated by means of a variable speed motor 10 with which is operatively connected a phonic wheel 11. A shutter 12 similar to shutters 9 is located in front of each observer. The eyes of the observers have been indicated by reference numerals 13. The motors 14 are synchronous motors that are connected with the motors 10 by means of conductors 15. In this view the connections between the different parts have been shown in a diagrammatic way only, but the connections are illustrated in greater detail in Fig. 3 in which the connections are shown in simplified form and to which reference will now be had.

In Fig. 3 the photo-electric cell has been designated by reference numeral 16 and this has its two electrodes 17 and 18 connected in series with a battery 19 and the primary coil 20 of a transformer whose secondary has been designated by reference numeral 21. The terminals 22 and 23 from the secondary 21 are connected to an ordinary two stage tuned amplifying circuit which is of ordinary construction and which will therefore not be described in detail. The output from the last amplifying unit passes through the primary 24 of a transformer whose secondary has been indicated by reference numeral 25, and the secondary coil is connected with a phonic wheel 11 whose magnetic structure has been indicated by reference numeral 26. The phonic wheel is provided with two poles 27 between which an armature 28 is rotatably mounted. The magnetic structure 26 is also mounted in such a way that it can be manually rotated in either direction, as designated by arrow 29. This rotation does not need to exceed 180 degrees and the purpose of this adjustment will appear as the description proceeds.

A shaft 30 has been shown as common to the rotor 28, the constant speed motor 10, the three-phase generator 31 and the shutter 9. The motor 10 has been illustrated as a direct current motor which obtains its energy from a direct current generator 32, or from a battery. The speed of the motor 10 can be adjusted by means of a rheostat 34 and in actual practice this rheostat is so constructed that the speed can be adjusted with great accuracy. When impulses such as light impulses are received by the photo-electric cell and, after being amplified if necessary, are transmitted to the magnetic structure of the phonic wheel, the pole pieces 27 will be periodically energized and if the motor 10 is running at a speed that places the rotor 28 in the position shown in Fig. 3 when the magnetism is the greatest, a synchronous operation is obtained. If the motor 10 is rotating slightly faster than it should, the rotor 28 will tend to retard the motor as it will be held back by the magnetic action of the poles 27 and similarly if the motor 10 is adjusted to rotate too slowly, the rotor 28 will have a tendency to advance the motor as it will be acted upon by the action of the poles so as to advance the rotation and in this way the speed of the shaft 30 can be maintained in exact synchronism with respect to any variable light source or any variable current applied to the pole windings of the phonic wheel. The lamp that produces the illumination has been designated by reference numeral 35 and located in front of this lamp is a shutter 9. It is necessary to rotate the shutters 12 and 9 in exact synchronism and in order to accomplish this, a three-phase generator, which has been designated by reference numeral 31, is connected to the shaft 30 and connected by means of conductors a, b and c with a synchronous motor 14. The rotors 31a and 37a are excited by direct current from the source 33. In the diagram, the generator 31 has been shown as a separate entity, but in actual construction leads may be taken from the armature winding of the direct current motor 10 and connected to slip rings on the shaft in such a way as to obtain a three-phase current. For the sake of clearness a separate generator has been illustrated.

Let us now assume that the headlight of an approaching locomotive intermittently throws a beam of light onto photo-electric cell 16. This will set up a variable current in the secondary winding 25 of the transformer that supplies current for energizing the phonic wheel magnets, and since the rotor 28 is rotated by means of a constant speed motor which has been adjusted as nearly as possible to the desired speed the phonic wheel will function to maintain the rotation of the shaft 30 at a speed that corresponds to the frequency of the lighting interruptions by means of which the photo-electric cell is affected. The shutter 12 is operated by the synchronous motor 14 and the two shutters 9 and 12 are so positioned that when the line of sight from the eye 13 is interrupted, the beam of light from the lamp 35 will also be interrupted, but when the light is permitted to shine through the openings in the shutter, the observer can also see the road, and in this way he can see any object that is illuminated by his own light. The shutters on the two approaching vehicles are so adjusted that when the light on one vehicle is permitted to shine onto the road, the light from the lamp on the other vehicle is intercepted by the shutter and at the same time the line of sight is intercepted with the result that each driver can see the road when it is illuminated by light from the lamp on his own vehicle, but cannot see it when the roadbed is illuminated by light from the lamp on the approaching vehicle and since the interruptions are of such frequency as to give the effect of continuous illumination, each driver can see the road before him, but is entirely protected against glare by the action of the shutters. In order to change the phase of the rotating shutters so as to get the desired effect, the magnetic structure 26 of the phonic wheel can be manually turned in one direction or the other, until the desired phase is obtained.

In Fig. 5 a diagram to a somewhat larger scale has been shown for the purpose of more clearly illustrating the construction of the phonic wheel. In this construction the magnetic structure has two diametrically opposed pole pieces 27 and the rotor 28 is provided with pole pieces 28a and it is apparent that if the rotor occupies the position shown in Fig. 5 when the magnetism is at its maximum, there is no force produced to act on the rotor, but if it is out of phase with the magnetic variations, there is a force produced which tends to either advance or retard the rotor.

In Fig. 4 another diagram has been shown in which the shutter 9 that interrupts the line of vision is also employed for interrupting the light beam from the lamp 35. With this arrangement the lamp is located on the same side of the shutter as the operator and the latter adjusts his position so that his eye is diametrically across from the lamp and therefore when the lamp beam shines through the opening in the shutter, the operator is also in position to view the road. The phonic wheel and the motor 10 are employed in the same manner as in connection with Fig. 3.

In Fig. 6 another diagram has been shown in which the ordinary incandescent lamp, which has been designated in other views by reference 35, has been replaced by a gaseous conduction or vapor lamp 38 of the type sometimes referred to as "Neon" lamps. These vapor lamps have the property of becoming luminous almost instantaneously as soon as the proper voltage is applied and of losing their luminosity as soon as the current is discontinued and can therefore be kept in step with a variable current supply. When a vapor lamp is employed, the phonic wheel and the variable speed motor are used as shown in the other diagrams. But the shaft 30 is provided with a cam 39, which, in the present arrangement, has two cam surfaces 40 diametrically opposed to each other. The number of cam surfaces correspond to the number of blades on the shutter which, in the diagram shown in Fig. 6, has two blades. When the cams 40 strike the movable contact member 41, a circuit is completed from the battery 42 through the lamp 38 and through the brush 43 to the shaft 30, and therefore the lamp 38 is illuminated twice during each revolution of the shaft. If desired, the battery 42 can be dispensed with and the current for illuminating the lamp 38 can be taken from the motor 10 by making a connection from the armature winding to a slip ring 44 located on the shaft and providing a brush 45 that is electrically contacted with the slip ring and then by moving the switch contact 46 to the terminal at the end of the conductor 47, a single phase alternating current supply is provided which illuminates the lamp 38.

In the above description the impulses for maintaining the two systems in synchronism have been assumed as being obtained from a photoelectric cell connected with the phonic wheel in the manner illustrated in Fig. 3. It is also possible to obtain the impulses for synchronism by other means than those requiring photo-electric cells and in Fig. 10 one such means has been shown. In the arrangement shown in Fig. 10, the rails 48 and 49 are connected to the ends of a magnetic core provided with a winding 50. This winding is excited by means of an alternating current from an alternating current circuit 51. When a locomotive passes over the rails, the magnetic impulses will pass through the wheels 52 and through the axle that connects the wheels and by surrounding the axle by a coil 53 an induced electric current will be obtained which passes through the primary winding 54 of a transformer whose secondary winding has been designated by reference numeral 55. The windings 54 and 55 may correspond to the windings 20 and 21 shown in Fig. 3 or the conductors 56 and 57 may be connected with the terminals of the primary winding 20 in Fig. 3; in any event when a locomotive passes over the rails in the manner shown in Fig. 10, the magnetic variations of the rails will set up a fluctuating current in the coil 53 which can be amplified and used to control the operation of the phonic wheel.

In Fig. 11 another arrangement has been shown in which the rails are connected directly with the opposite sides of the alternating current circuit, preferably through condensers 58 so as not to interfere with block signal systems. One axle of the pilot truck is provided with a coil 53, as explained in connection with Fig. 10, and whenever the locomotive passes over rails thus electrified, an alternating electric current will flow through the axle and set up an induced current in the coil 53 which can be amplified in the manner above described in connection with Fig. 10.

When the system is used in connection with electrically driven trolley cars like those illustrated in Fig. 7 the trolley wire 59, which receives its current from the generator 60 can have connected with it an apparatus like that indicated by reference numeral 61 which superimposes on the power current an alternating current ripple that operates through the action of the transformer 62 to produce the variable electrical impulses required to operate a phonic wheel or synchronous motor.

In Fig. 8 an electric lamp has been shown in which the shutters are located within the lamp. The filament has been designated by reference numeral 67 and this is located in a globe 64; positioned within the globe is a stationary cylindrical shutter 65 and a rotating shutter 9a. These shutters are each provided with a number of slots which permit light to shine through when the slots are in alignment. Carried by the cylindrical shutter 65 are a number of electromagnets 68 that are energized by an alternating current supply and operate on the pole pieces 69 so as to produce synchronous rotation of the shutter 9a. The parts, including the shutter 9a, electromagnets 68 and pole pieces 69 are arranged to form a synchronous motor and when a lamp like this is employed, the shutters 9 that have been shown as located in front of the lamps can be dispensed with. The rotating shutter can be provided with vanes 70 on its outer surface so that heat, light, molecular, electronic atomic, or ionic activities will assist in the rotation of this shutter. The addition of a slight positive potential to the shutter with respect to the filament will further assist in the rotation thereof.

From the above it will be seen that when two locomotives or other automotive vehicles are equipped with identical systems of the type above described, the two systems will be automatically synchronized, either by the light variations acting on a photo-electric cell or by means of alternating current impulses obtained as illustrated in Figs. 10 and 11 and when the current employed for motive power is obtained from an alternating current source instead of a direct current source, the alternating current can be employed for synchronizing the shutters on all the vehicles driven from this common source.

It is also possible to employ radio impulses for synchronizing the shutters and in such case the ordinary radio reception and amplifying circuits are employed, but as these are well known, they have not been illustrated.

Of the various methods that can be used to synchronize, it will be apparent that the use of photo-electric cells would be best. In case one of the photo cells became inoperative due to damage or such, the one on the approaching unit would regulate its speed to conform to the one that was without photo-electric control.

Where the synchronizing impulses are of considerable strength, it is possible to use mechanical relays either in conjunction with the amplifier or instead of it. This should be evident to those skilled in the art and is therefore not shown.

It is advantageous to apply suitable bias to an amplifier or mechanical resistance to a relay so that the reflected light rays of one unit will not affect the controlling of the same unit. In other words, the control should not function until the approaching light is greater than the reflected light. Negative bias applied to the grid of an amplifying tube, or mechanical resistance in case of a mechanical relay, will prevent the operation of the control unit until the impulse reaches a predetermined value.

Persistance of vision is also employed in the projection of motion pictures. It is customary to have a two-bladed shutter placed in the path of the light. Every second there are twenty-four frames (that is pictures per second) placed in the path of the light. These pictures are moved into proper position when one blade of a shutter cuts off the light. It is necessary to have the other blade of the shutter cross the path of the light also, although the film does not move during this interruption. This is done in order to give forty-eight interruptions per second so as to prevent flicker. When a device such as shown in Fig. 6 is applied to a motion picture projector, it is possible to discard the shutter for the illumination of the lamp 38 is controlled by the cam 39.

By the placing of a capacitor 21a (condenser) of suitable capacity across the secondary 21 of Fig. 3, this circuit can be made to resonate at a predetermined frequency and will accentuate the wanted impulses while rejecting or diminishing those impulses that are present but not wanted. This principle is well known in telephony and radio.

Having described the invention what is claimed as new is:

1. A system of glareless illumination comprising in combination, a source of light, means for periodically interrupting the light, a movable shutter located at an observation station and in the path of the light, means comprising a motor for operating the shutter, means responsive to the variation in frequency of a variable electric current connected with the motor for controlling the speed thereof, a device responsive to variations in the intensity of light incident thereon, located in the path of the light from said source, for producing an electric current whose frequency varies with the frequency of the light interruptions, and means for transmitting the electric current to the speed control means, comprising a tuned electric circuit connected between the light responsive electric current varying device and the speed control means of the motor, for preventing actuation of the speed control means by impulses not within a predetermined frequency range.

2. A system of glareless illumination comprising in combination, a source of light, means for periodically interrupting the light, a movable shutter located at an observation station and in the path of the light, means comprising a motor for operating the shutter, means responsive to the variation in frequency of a variable electric current operatively connected with the motor for controlling the speed thereof, means for supplying to the speed control means a variable electric current whose frequency bears a fixed ratio to the frequency of the light interruptions, said means comprising a tuned electric circuit connected between the variable current source and the speed control means of the motor, for preventing actuation of the speed control means by impulses not within a predetermined frequency range.

3. A system of glareless illumination comprising in combination, a source of light, means for periodically interrupting the light, a movable shutter located at an observation station and in the path of the light, means comprising a motor for operating the shutter, means responsive to the variation in frequency of a variable electric current connected with the motor for controlling the speed thereof, means for supplying to the speed control means a variable electric current whose frequency bears a fixed ratio to the frequency of the light interruptions, said means comprising a device responsive only to a predetermined range of frequencies of the variable electric current connected between the variable electric current source and the speed control means of the motor, for preventing actuation of the speed control means by impulses not within said predetermined frequency range.

4. A system of road illumination comprising, in combination, two oppositely facing vehicles, a source of light on each of the oppositely facing vehicles adjusted to project a beam of light in the direction in which it travels, each light source being provided with means for interrupting the beam of light at a rate which produces the effect of continuous illumination, a movable shutter located in front of each driver and positioned in the path of the beam of light from the other vehicle, means comprising a motor connected with each shutter for operating it so as to alternately conceal and expose the oppositely facing vehicle and its light, means connected with each motor for controlling its speed, comprising a device responsive to variations in the frequency of a variable electric current, means on each vehicle comprising a light sensitive current varying device positioned in the path of the light beam from the oppositely facing vehicle and connected with the frequency responsive device of the motor, means on each vehicle for so synchronizing the operation of the motor and the shutter with the light interruptions on the oppositely facing vehicle that the driver can see the roadway only when it is illuminated by the light on his own vehicle, the light interrupting means of the opposed vehicles being adjusted for alternate operation.

5. A system of roadway illumination comprising, in combination, a vehicle, a source of light carried thereby and positioned to illuminate the roadway in front thereof, a shutter positioned in front of the light source, means, comprising a motor provided with a speed control device responsive to variations in the frequency of a variable electric current, connected with the shutter for operating it to interrupt the light from the light source, a shutter located in front of the driver's eye, means comprising a synchronous motor operatively connected with the last-named shutter, for rotating it in synchronism with the first-named shutter the two motors being connected for synchronous operation, the shutters being so related that the driver can see the road only when the latter is illuminated by the light on his own vehicle, and means comprising a light sensitive current varying device connected with the speed control device of the first motor for synchronizing the shutters with another source of intermittent light carried by an approaching vehicle similarly equipped, so that the roadway is illuminated alternately from light sources on the approaching vehicles.

6. A road illuminating system, comprising, in combination, a vehicle, a lamp positioned thereon to throw a beam of light onto the road in front thereof, means for periodically interrupting the light beam so that the roadway is illuminated part of the time only, a shutter positioned between the driver of the vehicle and the roadway, means connected with the shutter for operating the same, comprising a motor provided with a speed control device responsive to the frequency of a variable electric current, said shutter when in one position intercepting the driver's line of vision and in another position permitting the driver to see the roadway, means comprising the motor and the speed control device for synchronizing the operation of the light interrupting means and the shutter so that the intervals during which the driver can see the road correspond to the intervals during which the roadway is illuminated by light from the lamp on his own vehicle, and means, responsive to forces originating outside of the vehicle for producing a variable electric current, for connection with the speed control device of the motor for controlling the motor speed whereby the illuminating systems of approaching vehicles similarly equipped and provided with similar speed control means can be synchronized to alternately illuminate the roadway and whereby neither of the drivers on the approaching vehicles can see the light on the other vehicle.

7. A road illuminating system comprising, in combination, a vehicle, a lamp positioned thereon to throw a beam of light onto the road in front thereof, means for periodically interrupting the light beam so that the roadway is illuminated part of the time only, a shutter positioned between the driver of the vehicle and the roadway, said shutter when in one position intercepting the driver's line of vision and in another position permitting the driver to see the roadway, means for synchronizing the light interrupting means and the movement of the shutter so that the intervals during which the driver can see the road correspond to the intervals during which the roadway is illuminated, said means comprising a constant speed motor, a speed control device responsive to variations in the frequency of a variable electric current operatively connected with the motor, and a light sensitive current varying device operatively connected with the speed control device, said light sensitive device being positioned in the path of light rays from a source of intermittent light located outside of the vehicle.

8. In a system of road illumination, in combination, a vehicle, a source of light thereon, means for periodically interrupting the light, a movable shutter positioned in the light path between the light source and the eye of an observer located at an observation point spaced from the light source, said shutter operating to interrupt the observer's line of vision, means connected with the observing shutter for operating it, comprising a motor having a speed control device responsive to current frequency variations, and a light sensitive, current varying device operatively connected to the speed control device and exposed to rays of intermittent light from the vehicle, for synchronizing the operation of the light and sight interrupting means so that the observer's line of sight will be interrupted when the light beam is projected.

9. A system of road illumination comprising in combination, two vehicles, a source of light on each vehicle, adjusted to project a beam of light in front thereof, means for interrupting the light beams, said means comprising an electric motor on each vehicle, a speed control device responsive to changes in frequency of a variable electric current associated with each motor, means for supplying an electric current of the same frequency to the speed control devices of the motors, whereby the light beams will be interrupted at the same frequency, means for adjusting the phase of the interruption, so that the light beams from the vehicles will alternate, means comprising a movable observing shutter on each vehicle for interrupting the line of sight of the driver of the vehicle at the same frequency as the light interruptions, means for operating the shutter, said means comprising the motor that controls the light interruptions and means interposed between the motor and the observing shutter for transmitting motion to the latter.

10. A system of glareless illumination comprising in combination, means for intermittently projecting a beam of light, a movable shutter located at a distance from said means and in the path of the light beam for intermittently interrupting the line of vision of an observer positioned behind the same, a motor operatively connected with the shutter, the motor being provided with a speed control device which is responsive to variations in the frequency of a variable electric current, and a light sensitive current varying device positioned in the path of the light beam and connected with the speed control device on the motor for synchronizing the movement of the shutter with the operation of the light projecting means so that the shutter obstructs the observer's line of vision when the light beam is projected.

11. A system of glareless illumination comprising, in combination, a source of light, means for projecting a beam of light from the same, means comprising a shutter for intermittently interrupting the beam of light, means comprising a motor for operating the shutter, a movable shutter located at a distance from said light source and in the path of the light beam for intermittently interrupting the line of vision of an observer located behind the same, a motor operatively connected with the last named shutter, each motor having a speed control device responsive to variations in the frequency of an electric current, means for supplying to the speed control devices an electric current of the same frequency for synchronizing the movement of the sight interrupting shutter with the light interrupting means so that the shutter will obstruct the observer's line of vision when the light beam is projected.

12. In a system of road illumination in combination, a vehicle, a source of light thereon, means for periodically interrupting the light, a movable shutter positioned in the light path between the light source and the eye of an observer located at an observation point spaced from the light source, said shutter operating to interrupt the observer's line of vision, means connected with the observing shutter for operating it, comprising a motor, a speed control device responsive to variations in the frequency of a variable electric current, comprising a phonic wheel connected with the motor, and means connected with the phonic wheel for supplying to it a variable electric current whose frequency is directly proportional to the frequency of the light interruptions.

MARION W. GIESKIENG.
PAUL F. GIESKIENG.